United States Patent [19]

Yoo

[11] Patent Number: 5,782,267
[45] Date of Patent: Jul. 21, 1998

[54] SOLENOID VALVE FOR AN ANTI-LOCK BRAKE SYSTEM AND VALVE FABRICATING METHOD

[75] Inventor: Jang-Yeol Yoo, Seoul, Rep. of Korea

[73] Assignee: Daewoo Electronics Co., Ltd., Seoul, Rep. of Korea

[21] Appl. No.: 619,205

[22] Filed: Mar. 21, 1996

[30] Foreign Application Priority Data

Sep. 19, 1995 [KR] Rep. of Korea .................. 95-30580

[51] Int. Cl.$^6$ .................................................. F16K 31/06
[52] U.S. Cl. ............................. 137/596.17; 137/625.65; 251/129.15
[58] Field of Search .................. 137/625.65, 596.17, 137/596.16; 303/119.2; 251/129.15, 129.01

[56] References Cited

U.S. PATENT DOCUMENTS 5,163,474  11/1992  Rizk .................. 303/119.2 X
5,618,087  4/1997  You .................. 303/119.2

*Primary Examiner*—Kevin Lee
*Attorney, Agent, or Firm*—Fish & Richardson P.C.

[57] ABSTRACT

An 2-position/3-way solenoid valve for an anti-lock brake system utilizing a modulator block as a component of the valve is disclosed. A valve housing is provided with only a first port, one of three pathways formed in the modulator block is communicated with the first port, and the others thereof serve as second and third ports. One end of the valve housing is closed by a cover, and an inlet nozzle is fitted at the other end thereof with a push rod inserted in a nozzle hole of the inlet nozzle. The push rod is fixed to an armature included within a first chamber which is defined by the inlet nozzle and the cover. The first chamber is communicated with the first port. A spool is integrally formed to the push rod and is positioned in a second chamber, which is defined by the inlet nozzle and an outlet nozzle mounted on the third port of the modulator block, to close one of the inlet and outlet nozzles. A method for fabricating the valve is also disclosed.

2 Claims, 5 Drawing Sheets

SOLENOID VALVE FOR AN ANTI-LOCK BRAKE SYSTEM AND VALVE FABRICATING METHOD

BACKGROUND OF THE INVENTION

1. Field of the Invention

The present invention relates to a 2-position 3-way solenoid valve for an anti-lock brake system, and more particularly to a 2-position 3-way solenoid valve for an anti-lock brake system in which a modulator block is utilized as a component of the valve.

2. Description of the Prior Art

An anti-lock brake system (hereinafter simply referred to as "ABS") is well known which prevents locking of wheels during performing a braking operation of a vehicle. If wheels are locked during the braking operation to slide along a road surface, a frictional force between tires and the road surface is decreased to lengthen the braking distance. An ABS has been developed to prevent locking of wheels. The ABS repeatedly increases, maintains or decreases a braking pressure exerted upon wheels to impede the locking of wheels. The increase of the braking pressure is generally designated an increase mode, the maintaining thereof is a hold mode, and the decrease thereof is a decrease mode. An ABS is generally formed of a pressure generating source which is not a master cylinder, i.e., a pump and the like, valves actuated in response to electric signals, sensors for monitoring a rotating speed of wheels and a controller for opening/closing the valves in accordance with an algorithm in order to attain the effective braking characteristic.

FIG. 1A is a schematic circuit diagram of a hydraulic system showing a conventional ABS utilizing 2-position 2-way (hereinafter simply referred to as "2/2") solenoid valves of normally open and normally closed types. In an increase mode, first and second 2/2 solenoid valves S220 and S221 are de-energized to open first valve S220 connected to an outlet of a hydraulic pump 120 and close second valve S221 connected to an inlet of hydraulic pump 120, so that a hydraulic pressure generated from hydraulic pump 120 is supplied to the brake wheel cylinder mounted to each of wheels. In a hold mode, first valve S220 is energized to close it, so that the constant pressure of the brake wheel cylinder is maintained. In a decease mode, first and second valves S220 and S221 are energized to close first valve S220 and open second valve S221, so that the pressure of the brake wheel cylinder is decreased. Such a system is stably operated, but two solenoid valves per channel are required. As a result, the utilized number of solenoid valves is increased and the overall ABS becomes bulky.

FIG. 1B is a schematic circuit diagram of a hydraulic system showing a conventional ABS utilizing 3-position 3-way (hereinafter simply referred to as "3/3") solenoid valves. In an increase mode, a 3/3 solenoid valve S330 is de-energized, so that hydraulic pressure generated from a hydraulic pump 120 is supplied to the brake wheel cylinder to increase the braking pressure. In a hold mode, a primary ON signal is applied to 3/3 solenoid valve S330 to close all three ports thereof, so that the constant pressure of the brake wheel cylinder is maintained. In a decrease mode, a secondary ON signal, of which the voltage is about twice that of the primary ON signal, is applied to 3/3 solenoid valve S330 to decrease the pressure of the brake wheel cylinder. In such a system, the utilized number of solenoid valves is decreased, since a solenoid valve per channel is utilized. However, the structure of the valve is complicated, the size thereof is large, an electronic control unit of a complicated structure is required because of performing 2-step voltage control and the response time becomes long. As a result, the system operates unstably.

Therefore, the development of an ABS which operates stably and has the reduced number of utilized valves and the development of a solenoid valve for the ABS have been required.

In order to overcome the foregoing problems, the present inventor has proposed a 2/3 solenoid valve in which a modulator block is utilized as a component of the valve, taking notice of the point that solenoid valves are coupled with a modulator block in an ABS.

SUMMARY OF THE INVENTION

An object of the present invention is to provide a 2/3 solenoid valve utilizing a modulator block as a component of the valve and thus being capable of reducing a manufacturing cost of a modulator for an ABS and the size and weight thereof.

Another object of the present invention is to provide a method for fabricating a 2/3 solenoid valve for an ABS.

To achieve one object of the present invention, there is provided a solenoid valve comprising:

a valve body having a generally cylindrical housing provided with a port for receiving fluid from a pressure generating source and a generally circular cover coupled to one end of the housing to close the one end of the housing and having a protrusion extending into the housing in the center of one side of the cover;

a modulator block having a first pathway for receiving fluid, a second pathway for flowing in/flowing out fluid and a third pathway for exhausting fluid and coupled with the valve body by fitting of the valve body to communicate the first pathway with the port;

a barrier wall for partitioning a chamber defined by the housing, the cover and the modulator block into first and second chambers, the first chamber being communicated with the port and the second chamber being communicated with the second and third pathways, the barrier wall having a first opening for communicating the first chamber with the second chamber;

valve means extending to the second chamber from the first chamber through the first opening and movable along the longitudinal direction of the valve body in response to an electric signal for opening one of the third pathway and the first opening provided to the barrier wall and closing the other one of the third pathway and the first opening, the valve means being positioned at a first position of closing the third pathway and opening the first opening in a normal state that the electric signal is not applied or at a second position of opening the third pathway and closing the first opening in an active state that the electric signal is applied, whereby the port is communicated with the second pathway or the third pathway is communicated with the second pathway; and a solenoid assembly disposed within the housing to surround the protrusion and having an annular solenoid coil, an annular bobbin wound by the solenoid coil and a pair of electrodes electrically connected to the solenoid coil and exposed to the exterior of the valve body for moving the valve means to the second position from the first position in response to the electric signal.

To achieve another object of the present invention, there is provided a method for fabricating a solenoid valve comprising the steps of:

fabricating a modulator block assembly;

fabricating a solenoid valve assembly; and coupling the solenoid valve assembly into the modulator block assembly, wherein the step of fabricating the modulator block assembly comprises the steps of:

tightly fitting an outlet nozzle in a modulator block having a first pathway for receiving fluid, a second pathway for flowing in/flowing out fluid and a third pathway for exhausting fluid to communicate a nozzle hole of the outlet nozzle with the third pathway and hermetically coupling the outlet nozzle to the modulator; and inserting a caliper filter for filtering the fluid from the second pathway in the modulator block, and the step of fabricating the solenoid valve assembly comprises the steps of:

fabricating valve means comprising the steps of inserting a push rod having a spool integrally formed at one end thereof in an inlet nozzle and a bushing, fitting the other end of the push rod in a first closed hole formed at the center of one end of an armature, fitting a spring guiding rod in a second closed hole formed at the center of the other end of the armature and pressing the armature radially to secure the push rod and the spring guiding rod;

forming a chamber defined by a housing, a cylindrical sealing member and a protrusion formed in the center of one side of a cover and fitted in the sealing member in order to obtain a space capable of receiving and reciprocating the valve means, the step comprising the steps of fitting the sealing member in the housing, inserting a bobbin wound by a solenoid coil in a space between the housing and the sealing member, tightly fitting the cover in the housing and hermetically coupling the cover to the housing;

inserting, in the chamber, the valve means of which the spring guiding rod is inserted in the spring;

hermetically coupling the inlet nozzle to the housing; and successively mounting a first O-ring, a pump filter for filtering the fluid from the first pathway and a second O-ring on the circumference of the housing.

In the 2/3 solenoid valve according to the present invention, when the solenoid coil is de-energized, the spool closes the third port by the resilient force of the spring, so that the first and second ports are communicated with each other. When the solenoid coil is energized, the spool is retracted by overcoming the resilient force to open the third port and close the first port, so that the second and third ports are communicated with each other.

The 2/3 solenoid valve according to the present invention has a simple structure and the reduced number of component parts. Therefore, the possibility of operational errors becomes low to enhance the reliability of operation. Also, the response time becomes short, so that an ABS having the good performance can be constructed.

An ABS constructed by the 2/3 solenoid valve according to the present invention starts to operate on the basis of speed signals from wheel speed sensors mounted to wheels when a driver steps on the brake pedal. In an increase mode, the hydraulic pressure generated from a pump is supplied to brake wheel cylinders through first and second ports of the 2/3 solenoid valve according to the present invention. At this time, the solenoid coil is de-energized, because the 2/3 solenoid valve is a normally open type. In a decrease mode, the solenoid coil is energized to close the first port and communicate the second port with the third port. When the second and third ports are communicated with each other, some fluid stored in the brake wheel cylinders is transmitted to the accumulator through the third port, so that the braking pressure is reduced. A hold mode is acquired by repeating the opening/closing of the 2/3 solenoid valve under a PWM signal control or a bang-bang control.

The ABS composed of 2/3 solenoid valve according to the present invention is simply constructed to reduce the possibility of the erroneous operation, since one 2/3 solenoid valve is assigned to one channel so that the number of solenoid-driven valves is reduced. Therefore, the ABS has the reliable braking characteristic.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Figure 1B:
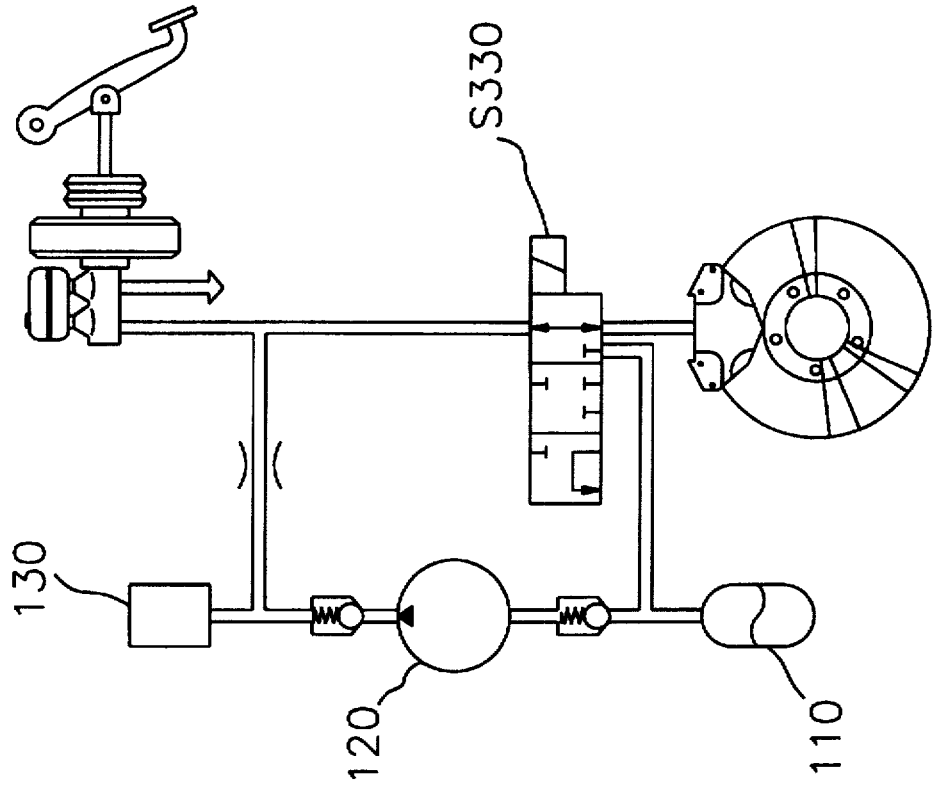
FIG. 1B is a schematic view showing a conventional ABS utilizing 3/3 solenoid valve.
Figure 1A:
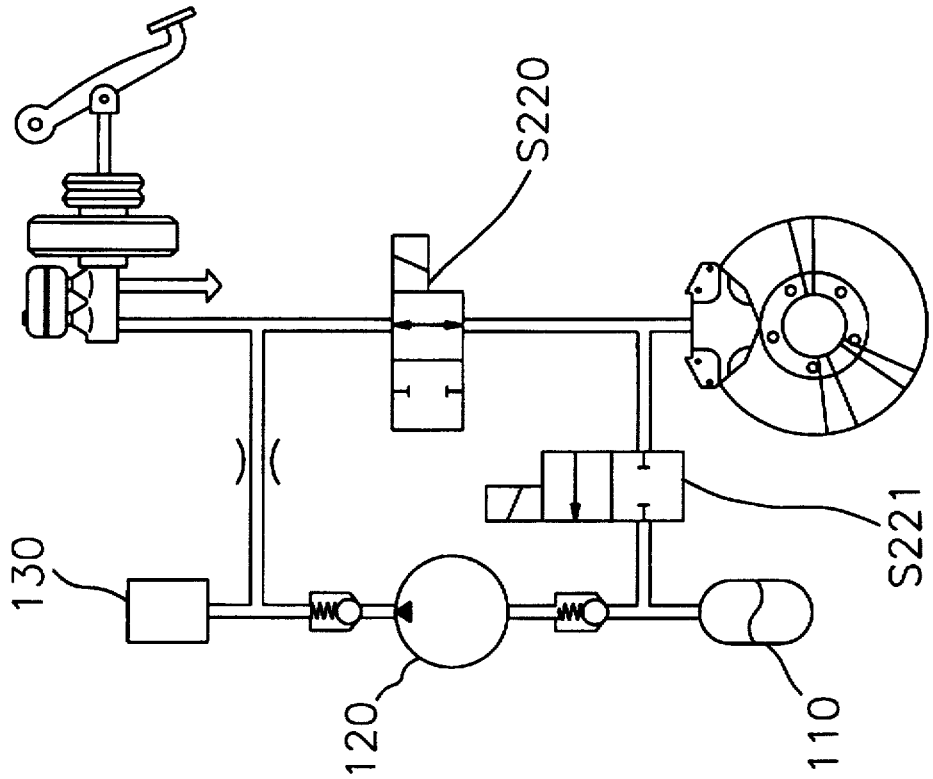
FIG. 1A is a schematic view showing a conventional ABS utilizing 2/2 solenoid valve.

Hereinafter, the preferred embodiment of a 2/3 solenoid valve according to the present invention will be described in detail with reference to FIGS. 2 and 5.

A 2/3 solenoid valve 100 according to this embodiment includes a modulator block assembly 110 and a valve assembly 120. A modulator block 1 has three fluid passages which are communicated with a master cylinder 82, brake wheel cylinders mounted to wheels but not shown in the drawings and an accumulator 66, respectively. One passage, through which the hydraulic pressure generated from master cylinder 82 or a pump 58 is transmitted as indicated in the direction of arrow A, is communicated with a first port 20 through a pump filter 15. Another passage communicated with the brake wheel cylinders, through which the hydraulic pressure is transmitted as indicated in the direction of arrows B, serves as a second port 30, and the other passage communicated with accumulator 66, through which the hydraulic pressure is transmitted as indicated in the direction of arrow C, serves as a third port 40.

Third port 40 is communicated with a second chamber 32 through an outllETitle:refrigerator+evaporator+freezer modulator block 1 and is defined by an inlet nozzle 7 and outlet nozzle 8. inlet nozzle 7 coupled to a housing 2 by the press fitting and caulking process, and outlet nozzle 8 coupled to modulator block 1 by the press fitting and caulking process to communicate with third port 40 formed to modulator block 1. Second chamber 32 also is communicated with second port formed to modulator block 1 through a caliper filter 14.

A first chamber 28 is formed in housing 2, and inlet nozzle 7 defines one end of first chamber 28 and a solenoid cover 3 defines the other end thereof.

Within first chamber 28, a spring 13, a spring guiding rod 12, an armature 6, a push rod 22 and a bushing 10 are included. With spring guiding rod 12 inserted, one end of spring 13 is supported by cover 3 and the other end thereof is supported by armature 6. Spring guiding rod 12 is fitted in the center of one end of armature 6 and serves for guiding and supporting spring 13. Armature 6 is made of ferromagnetic materials, and housing 2 may be made of the same materials as armature 6 is made of. Push rod 22 is fitted in the center of the other end of armature 6.

Push rod 22 extends through bushing 10 and inlet nozzle 7, and a spool 9 is integrally provided at one end of push rod 22. Push rod 22 is coupled to armature 6 by press fitting. Bushing 10 serves for supporting pushing rod 22 and is provided with through holes through which the fluid passes as well as an opening through which push rod 22 is inserted. The shape and number of the through holes are not especially limited as long as the solenoid valve operates smoothly. Spool 9 reciprocates axially to open inlet nozzle 7 and close outlet nozzle 8 or vice versa. Push rod 22 and spool 9 are manufactured by cold rolling, for example, and preferably, have Rockwell hardness of 60 to 65. One end of spool 9 landing on an outlet valve seating surface 26 of outlet nozzle 8 has a hemispherical shape, and outlet valve seating surface 26 is shaped to match with one end of spool 9 landing thereon.

The diameter of an inlet nozzle hole 34 is larger than that of push rod 22 passing therethrough, so that a gap is formed between inlet nozzle hole 34 and push rod 22. Through the gap, first and second chambers 28 and 32 are communicated with each other. An inlet valve seating surface 24 of inlet nozzle 7 is shaped to match with the other end of spool 9 landing thereon, so that the fluid flow through inlet nozzle 7 is blocked while landing on spool 9.

Since 2/3 solenoid valve 100 according to this embodiment is a normally open type, spool 9 is located at an open position, where spool 9 lands on outlet valve seating surface 26, in a normal state that electric power is not supplied, so that third port 40 is closed. Thus, in the normal state, the braking pressure generated from master cylinder 82 and pump 58 is provided to the brake wheel cylinder through first port 20, first chamber 28, inlet nozzle 7, second chamber 32 and second port 30. When a solenoid coil 5 is energized, the magnetic flux generated from a solenoid assembly 18 permits armature 6 to overcome the resilient force of spring 13, so that armature 6 is retracted toward cover 3. Accordingly, spool 9 is forced to land on inlet valve seating surface 24 of inlet nozzle 7 after separating from outlet valve seating surface 26 of outlet nozzle 8, so that spool 9 is located at a closing position to close inlet nozzle 7. When spool 9 is in the closing position, first port 20 is closed and third port 40 is open, so that second and third ports 30 and 40 are communicated with each other.

A solenoid assembly 18 is composed of an annular solenoid coil 5 and a bobbin 4 wound with solenoid coil 18. Bobbin 4 is integrally formed by molding, for example, in order to prevent the fluid from intruding in solenoid coil 5 wound on bobbin 4. Further, solenoid assembly 18 is fitted on the circumference of a cylinder 11 which serves for protecting solenoid assembly 18 from the fluid being in first chamber 28. Cylinder 11 is made of non-magnetic materials in order to block the magnetic flux generated from solenoid assembly 18. Electric terminals 36 are exposed to the exterior of housing 2 and connected with conductive wires, respectively, to energize solenoid coil 5.

In one end of cylinder 11, a protrusion 19 of cover 3 is inserted in order not to leak the fluid. Protrusion 19 is cylindrically shaped to be exactly fitted with the inner surface of cylinder 11, and a bore 38 of which an end is closed is formed to insert spring 13 at the center of protrusion 19. One end of spring 13 is supported on the closed surface of bore 38, and the other end thereof is supported on armature 6, and hence, armature 6 is pressed toward bushing 10 by a predetermined force.

First and second O-rings 16 and 16' are provided on the circumference of housing 2 and a pump filter 15 is provided therebetween. First and second O-rings 16 and 16' serve for maintaining the hermetic state of first port 20.

Figure 3:
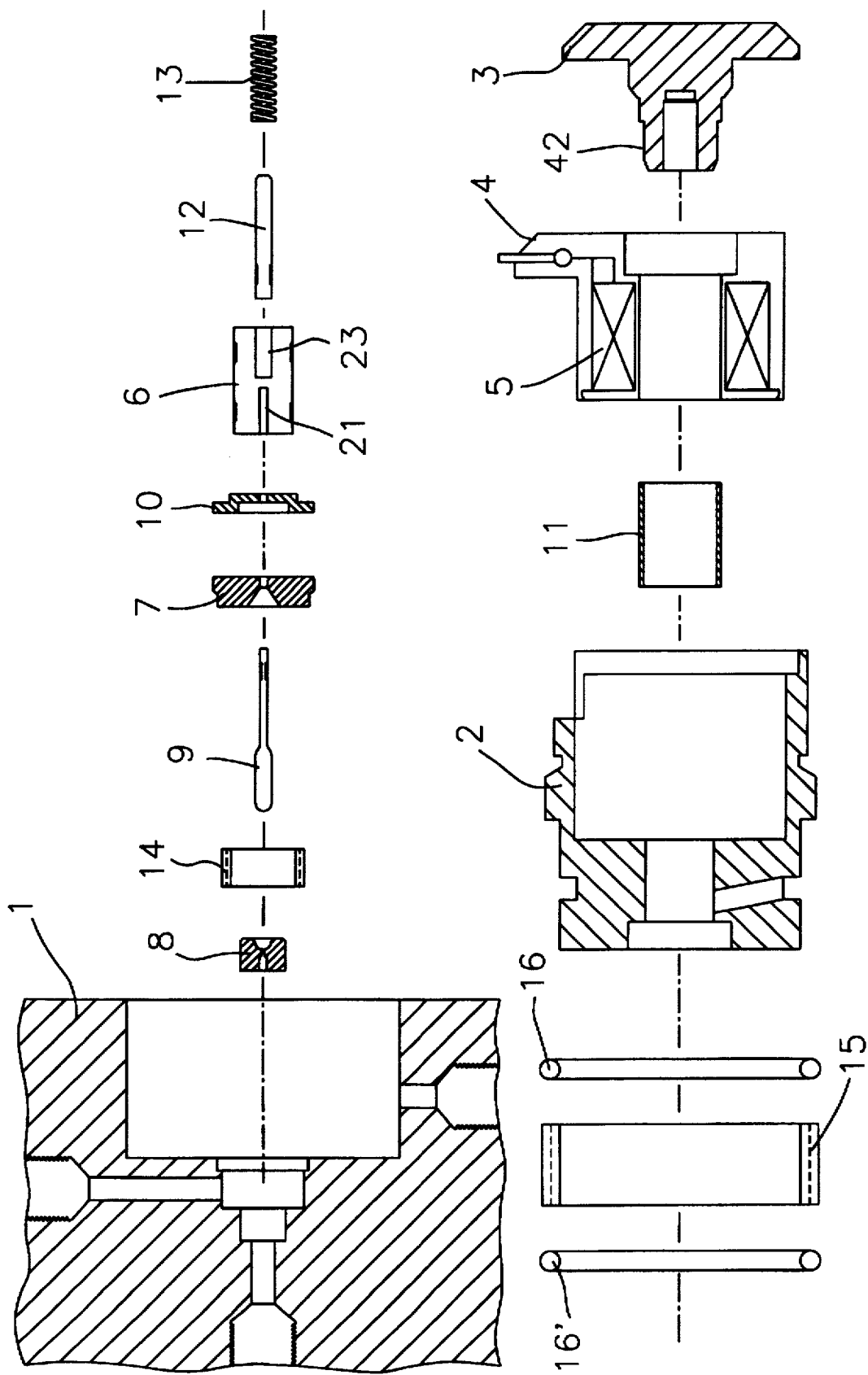
FIG. 3 is an exploded sectional view of a 2/3 solenoid valve according to the present invention.
Figure 4:
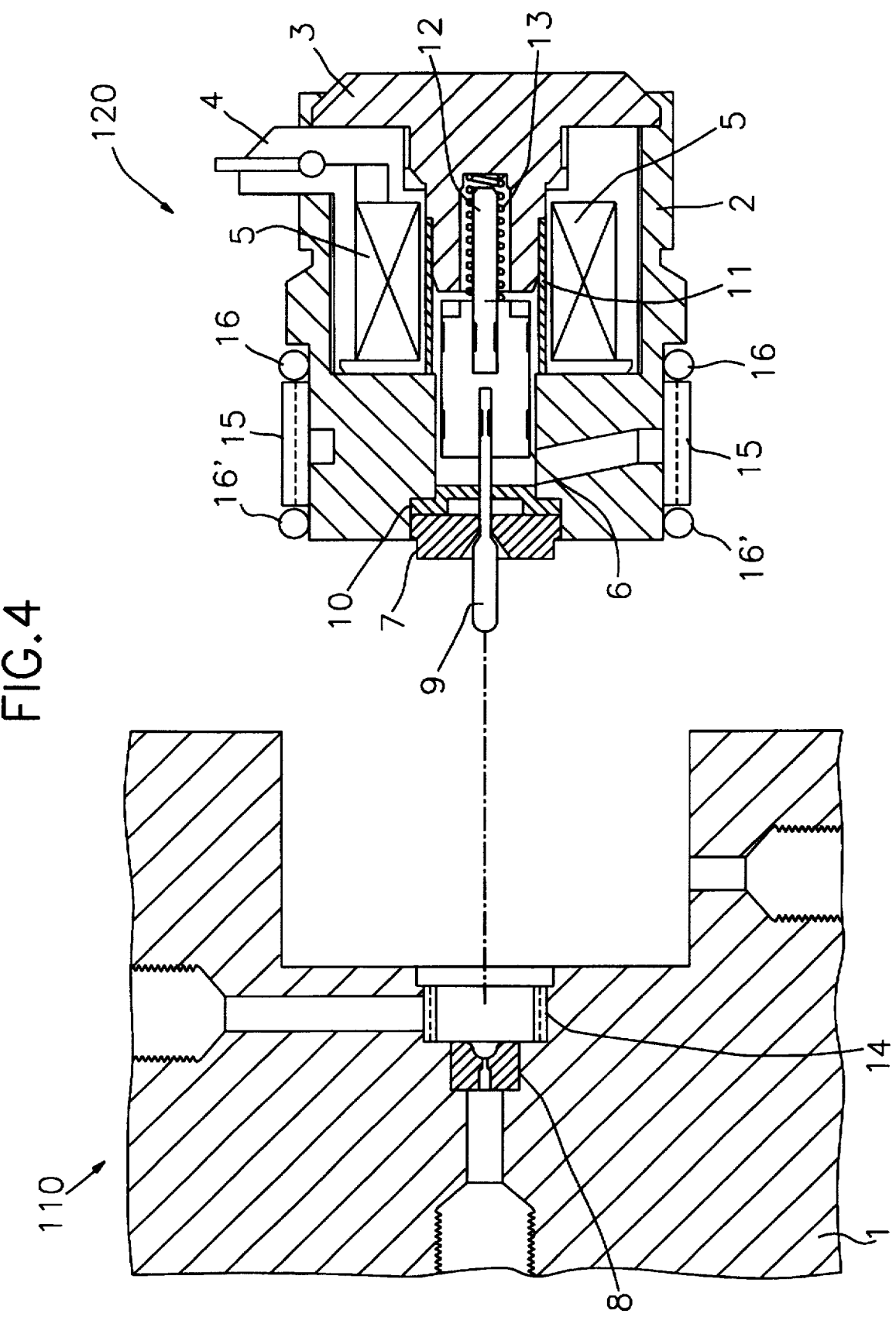
FIG. 4 is an exploded sectional view of a 2/3 solenoid valve according to the present invention, showing a modulator block assembly and a solenoid valve assembly which have been each assembled prior to their coupling.

FIGS. 3 and 4 are exploded sectional views of 2/3 solenoid valve according to this embodiment. Outlet nozzle 8 is tightly fitted to modulator block 1, and by the caulking process, the hermetic state between modulator block 1 and outlet nozzle 8 is maintained. And then, caliper filter 14 is inserted to complete the fabrication of modulator block assembly 110.

Solenoid valve assembly 120 is fabricated in following sequence.

After cylinder 11 of stainless steel is press-fitted in housing 2, bobbin 4 molded with solenoid coil 5 is inserted in a space between housing 2 and cylinder 11. Solenoid cover 3 is fitted to cylinder 11 and is coupled to housing 2 by caulking. At fitting, a tapered surface 42 formed on protrusion 19 of cover 3 is tightly fitted to the inner surface of cylinder 11 to ensure the hermetic state.

After passing through inlet nozzle 7 and bushing 10, push rod 22 having spool 9 integrally formed is inserted in a first hole 21 which is provided at one side of armature 6. Spring guiding rod 12 is inserted in a second hole 23 which is provided at the other side of armature 6 opposite to one side thereof. Then, armature 6 is pressed radially to fix push rod 22 and spring guiding rod 12 to armature 6.

Spring 13 is mounted around spring guiding rod 12, and armature 6 having push rod 22, spring guiding rod 12 and spring 13 is mounted into housing 2. Inlet nozzle 7 is coupled to housing 2 by caulking, so that inlet nozzle 7 and housing 2 are fixed to each other and the hermetic state therebetween is ensured.

First O-ring 16, pump filter 15 and second O-ring 16' are mounted on the outer circumference of housing 2 in that order. Thus, the fabrication of solenoid valve assembly 120 is completed. In FIG. 4, modulator block assembly 110 and solenoid valve assembly 120 are each shown with their fabrication completed. Solenoid valve assembly 120 is inserted into modulator block assembly 110, and then, the fabrication of 2/3 solenoid valve according to the present invention is completed.

Figure 5:
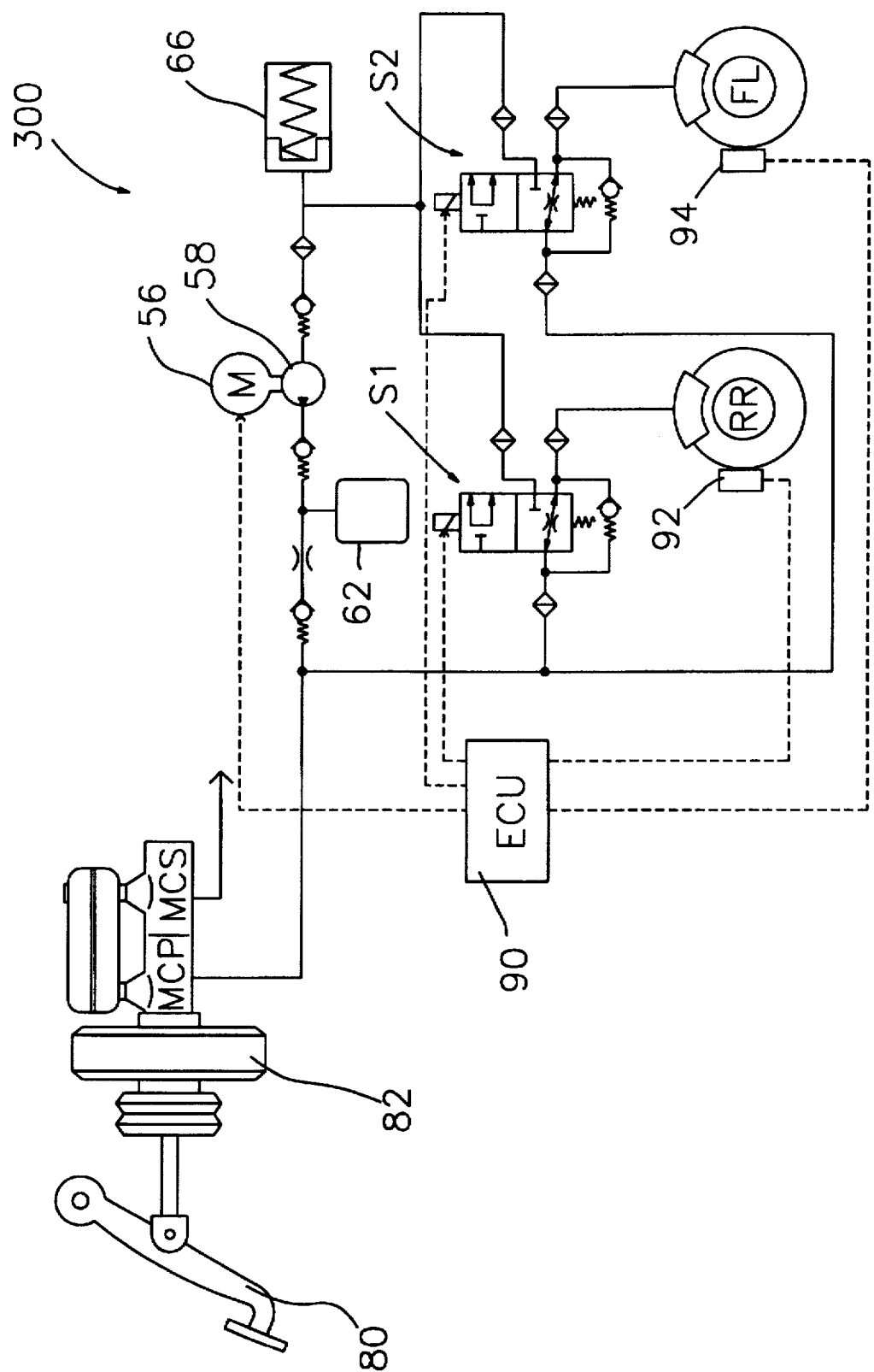
FIG. 5 is a constructional view of an ABS provided with the 2/3 solenoid valve according to the present invention.

FIG. 5 is a construction view showing one example of ABS 300 utilizing 2/3 solenoid valve according to the present invention. ABS 300, as shown, is for the brake system of the diagonal split type that one front wheel and the diagonally opposite rear wheel are assigned to each of two master cylinders, but it is not especially limited to this type. To promote the understanding, FIG. 5 shows only the hydraulic circuit diagram including a primary master cylinder MCP and rear right and front left wheels RR and FL assigned to primary master cylinder MCP. First and second wheel speed sensors 92 and 94 are each mounted to rear right and front left wheels RR and FL, and the speed signal outputted from first and second wheel speed sensors 92 and 94 is inputted to an ECU 90 for controlling the operation of ABS 300. A motor 56 for driving a pump 58 and first and second solenoid valves S1 and S2 are connected to the output of ECU 90.

Figure 2:
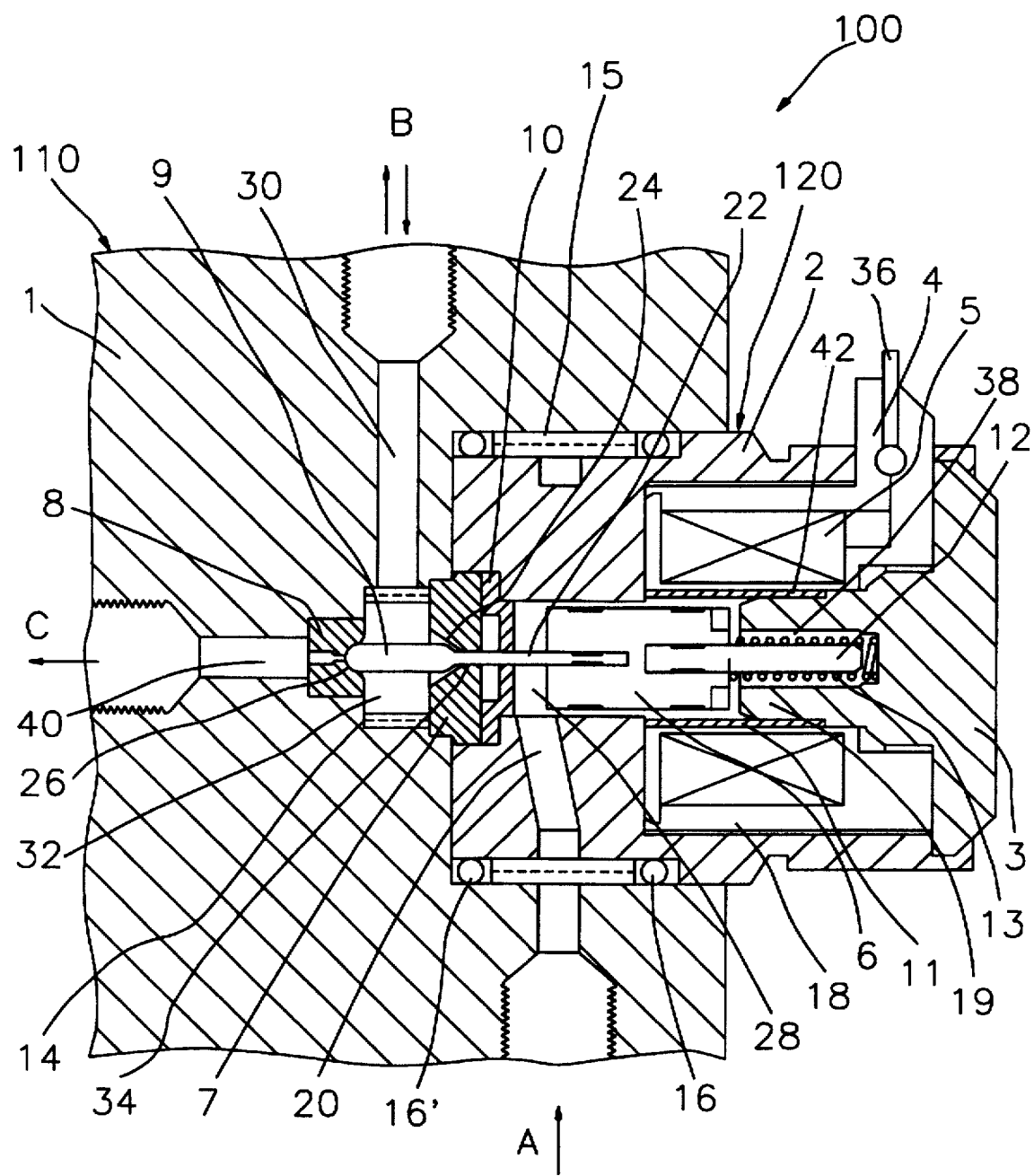
FIG. 2 is a sectional view of a 2/3 solenoid valve according to the present invention.

With reference to FIGS. 2 and 5, hereinafter, the operation of 2/3 solenoid valve 100 according to the present invention and ABS 300 utilizing the solenoid valve will be described.

In a normal state that ABS is not operated, the hydraulic pressure generated from primary master cylinder MCP is provided to brake wheel cylinders, each of them being mounted to wheels RR and FL, after passing through first and second ports 20 and 30 successively, when a driver steps on a brake pedal 80. When ABS 300 is operated by a predetermined algorithm stored in ECU 90, the motor driving signal is outputted from ECU 90 to drive motor 56 and the valve switching signal is outputted from ECU 90 to open/close first and third ports 20 and 40 of each of first and second solenoid valves S1 and S2, whereby the braking pressure is increased, held or decreased.

In an increase mode, the hydraulic pressure generated from pump 58 passes through a damper 62 and then, as in the normal state, is provided to the brake wheel cylinders, each of them being mounted to wheels RR and FL, through first and second ports 20 and 30, so that the braking pressure is increased. Since 2/3 solenoid valve 100 according to the present invention is a normally open type, spool 9 lands on outlet valve seating surface 26 by the resilient force of spring 13 to close third port 40 when solenoid coil 5 is de-energized and hence, the hydraulic pressure generated from pump 58 is provided to brake wheel cylinders via the same pathway as in the normal state that ABS 300 is not operated. Damper 62 disposed to the outlet of pump 58 serves for reducing the fluctuation of the hydraulic pressure caused by the pumping operation of pump 58.

In a decrease mode, solenoid coil 5 is energized, so that armature 6 overcomes the resilient force of spring 13 to move toward solenoid cover 3. Spool 9 is detached from outlet valve seating surface 26 and lands on inlet valve seating surface 24, so that first port 20 is closed and third port 40 is opened. Accordingly, the fluid within brake wheel cylinders is provided to an accumulator 66, passing through second and third ports 30 and 40 successively, whereby the braking pressure is decreased.

A hold mode is accomplished by repetitively operating spool 9 by means of utilizing the signal modulating methods, such as a pulse width modulation and a bang-bang control. That is, when solenoid coil 6 is energized and de-energized, repetitively, spool 9 is forced to open first port 20 and close third port 40, and vice versa, whereby the constant braking pressure is maintained.

As described above, because of utilizing modulator block as a component of the valve, the 2/3 solenoid valve according to the present invention is simply constructed and requires the reduced number of component parts. Therefore, the possibility of operational errors becomes low to enhance the reliability of operation. Also, the manufacturing cost is reduced because the 2/3 solenoid valve can be easily assembled.

The ABS composed of the 2/3 solenoid valve according to the present invention is simply constructed to reduce the possibility of the erroneous operation, since one 2/3 solenoid valve is assigned to one channel so that the number of solenoid-driven valves may be reduced. Therefore, the ABS has the reliable braking characteristic.

While the present invention has been particularly shown and described with reference to particular embodiment thereof, it will be understood by those skilled in the art that various changes and modifications may be effected therein without departing from the spirit and scope of the invention as defined by the appended claims.

What is claimed is:

1. A method for fabricating a solenoid valve comprising the steps of:

fabricating a modulator block assembly;

fabricating a solenoid valve assembly into said modulator block assembly, said step of fabricating said modulator block assembly comprises the steps of:

tightly fitting an outlet nozzle in a modulator block having a first pathway for receiving fluid, a second pathway for inflowing/outflowing fluid and a third pathway for exhausting fluid to communicate a nozzle hole of said outlet nozzle with said third pathway and hermetically coupling said nozzle to said modulator; and inserting a caliper filter for filtering the fluid from said second pathway in said modulator block, and said step of fabricating said solenoid valve assembly comprises the steps of:

fabricating valve means comprising the steps of inserting a push rod having a spool integrally formed at one end thereof in an inlet nozzle and a bushing, fitting the other end of said push rod in a first closed hole formed at the center of one end of an armature, fitting a spring guiding rod in a second closed hole formed at the center of the other end of said armature and pressing said armature radially to secure said push rod and said spring guiding rod;

forming a chamber defined by a housing, a cylindrical sealing member and a protrusion formed in the center of one side of a cover and fitted in said sealing member in order to obtain a space capable of receiving and reciprocating said valve means, the step comprising the steps of fitting said sealing member in said housing, inserting a bobbin wound by a solenoid coil in a space between said housing and said sealing member, tightly fitting said cover in said housing and hermetically coupling said cover to said housing;

inserting, in said chamber, said valve means of which said spring guiding rod is inserted in said spring; hermetically coupling said inlet nozzle to said housing; and successively mounting a first O-ring, a pump filter for filtering the fluid from said first pathway and a second O-ring on the circumference of said housing.

2. The method as claimed in claim 1, wherein the hermetical coupling of said modulator block and said outlet nozzle, the hermetical coupling of said housing and said inlet nozzle and the hermetical coupling of said cover and said housing are acquired by caulking process.

* * * * *